United States Patent
Brown

(10) Patent No.: US 10,055,699 B2
(45) Date of Patent: Aug. 21, 2018

(54) SYSTEM FOR SUPERMARKET ENERGY MANAGEMENT

(75) Inventor: Frank C. Brown, Blacksburg, VA (US)

(73) Assignee: Automation Creations, Inc., Blacksburg, VA (US)

( * ) Notice: Subject to any disclaimer, the term of this patent is extended or adjusted under 35 U.S.C. 154(b) by 1061 days.

(21) Appl. No.: 12/896,469

(22) Filed: Oct. 1, 2010

(65) Prior Publication Data
US 2011/0106759 A1 May 5, 2011

Related U.S. Application Data

(60) Provisional application No. 61/257,685, filed on Nov. 3, 2009.

(51) Int. Cl.
*G06Q 10/00* (2012.01)
*G06Q 10/06* (2012.01)
*F25B 49/00* (2006.01)

(52) U.S. Cl.
CPC ............ *G06Q 10/06* (2013.01); *F25B 49/005* (2013.01); *F25B 2400/22* (2013.01)

(58) Field of Classification Search
CPC ...... G06Q 10/20; G06Q 10/06; F25B 49/005; F25B 2400/22
(Continued)

(56) References Cited

U.S. PATENT DOCUMENTS

| | | |
|---|---|---|
| 6,462,654 B1 | 10/2002 | Sandelman et al. |
| 6,647,735 B2 | 11/2003 | Street et al. |

(Continued)

OTHER PUBLICATIONS

Wikipedia, Interleaving, retrieved archived data of Nov. 12, 2007, http://web.archieve.org/web/20071112064440/http://en.wikipedia.org/wiki/Interleaving.*

(Continued)

*Primary Examiner* — Gerardo Araque, Jr.
(74) *Attorney, Agent, or Firm* — New River Vally IP Law, PC; Michele L. Mayberry

(57) ABSTRACT

The present invention relates to the field of supermarket refrigeration & HVAC control. More particularly, embodiments of the present invention provide systems and methods for concurrent and remote management of multiple supermarket refrigeration systems located at one or more retail sites. Embodiments may include at least one on-site computer, at least one central server, at least one user computer, one or more communication network, and one or more on-site refrigeration control systems. In embodiments, the on-site computer communicates with the on-site refrigeration control system(s), which may be the same or different, and multiple on-site computers and/or different store locations may be used. The on-site computer is capable of translating data received from these various refrigeration control systems into a single system-friendly generic format and the translated data is stored on the on-site computer. This data is intermittently copied and stored on a central server. Meanwhile, data and more particularly data updates are sent from the refrigeration control system to the on-site computer for storage. At a desired interval, for example every five minutes, the central server detects whether the information on the on-site computer is different from the information on the server. When there has been an update, the server downloads the current information in bulk from the on-site computer. The information on the server is then accessed by one or more users to manage the refrigeration control systems, optionally remotely. In contrast with other existing refrigeration control management systems, systems and methods of the present invention can be used with multiple legacy refrigeration control systems, including old and new versions of a system from one particular OEM provider, and/or different models from one particular OEM provider, and/or different versions or models from several different OEM providers. These systems and methods provide for compatibility between different control systems, which does not currently exist. Benefits of the inventive systems and methods include being capable of delivering information to a user, in response to a user query, faster than systems in (Continued)

which the user computer communicates with and obtains data stored on the legacy system itself.

15 Claims, 10 Drawing Sheets

(58) Field of Classification Search
USPC ........................................................ 705/305
See application file for complete search history.

(56) References Cited

U.S. PATENT DOCUMENTS

| | | | |
|---|---|---|---|
| 6,675,591 | B2 | 1/2004 | Singh et al. |
| 6,745,581 | B2 | 6/2004 | King et al. |
| 6,955,302 | B2 | 10/2005 | Erdman et al. |
| 7,024,870 | B2 | 4/2006 | Singh et al. |
| 7,320,225 | B2 | 1/2008 | Street et al. |
| 7,369,968 | B2 | 5/2008 | Johnson et al. |
| 7,490,477 | B2 | 2/2009 | Singh et al. |
| 7,565,225 | B2 | 7/2009 | Dushane |
| 7,644,591 | B2 | 1/2010 | Singh et al. |
| 2003/0001720 | A1 | 1/2003 | Wade et al. |
| 2004/0060305 | A1 | 4/2004 | Singh et al. |
| 2004/0088069 | A1 | 5/2004 | Singh |
| 2006/0020426 | A1 | 1/2006 | Singh |
| 2007/0089435 | A1 | 4/2007 | Singh et al. |
| 2007/0256437 | A1 | 11/2007 | Singh et al. |
| 2009/0018673 | A1 | 1/2009 | Dushane et al. |
| 2009/0149973 | A1 | 6/2009 | Keller et al. |

OTHER PUBLICATIONS

Webopedia, Interleave, retrieved archive date of May 28, 2007, http://web.archive.org/web/20070528231428/http://www.webopedia.com/TERM/I/interleaving.html.*

Venti "Venti: a new approach to archival storage", Archive date of Nov. 13, 2007, http://web.archive.org/web/20071113083259/http://doc.cat-v.org/plan_9/4th_edition/papers/venti/.*

Richard Barker,"Managing a Data Warehouse", Chief Technology Officer, SVP, Veritas Software Corporation, Chertsey, United Kingdom, Veritas Software Corporation, Feb. 1998, and EOUG 1998.*

CORD Newsletter, Council of Emergency Medicine Residency Directors, Jul./Aug. 1999, Meeting in Boston on May 21.*

Kan Yabumoto, XXCopy Technical Bulletin #17, "Selecting files by file date amd time using XXCopy", Revised date of Feb. 23, 2001, http://www.xxcopy.com/xxcopy17.htm.*

* cited by examiner

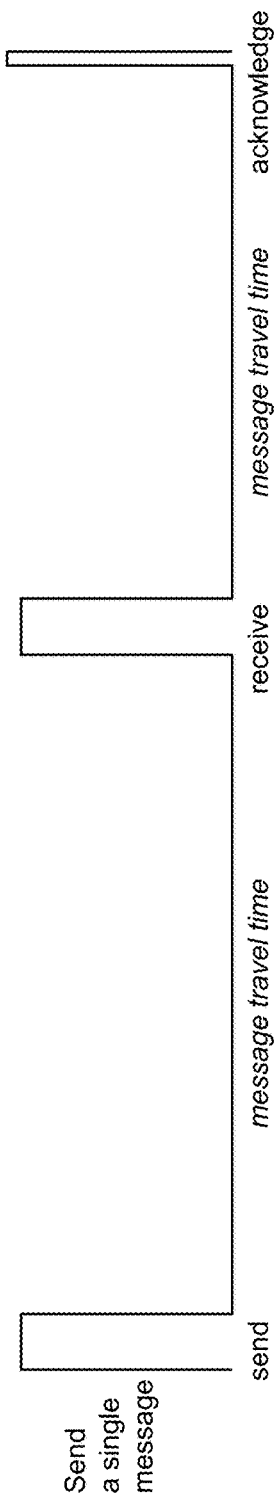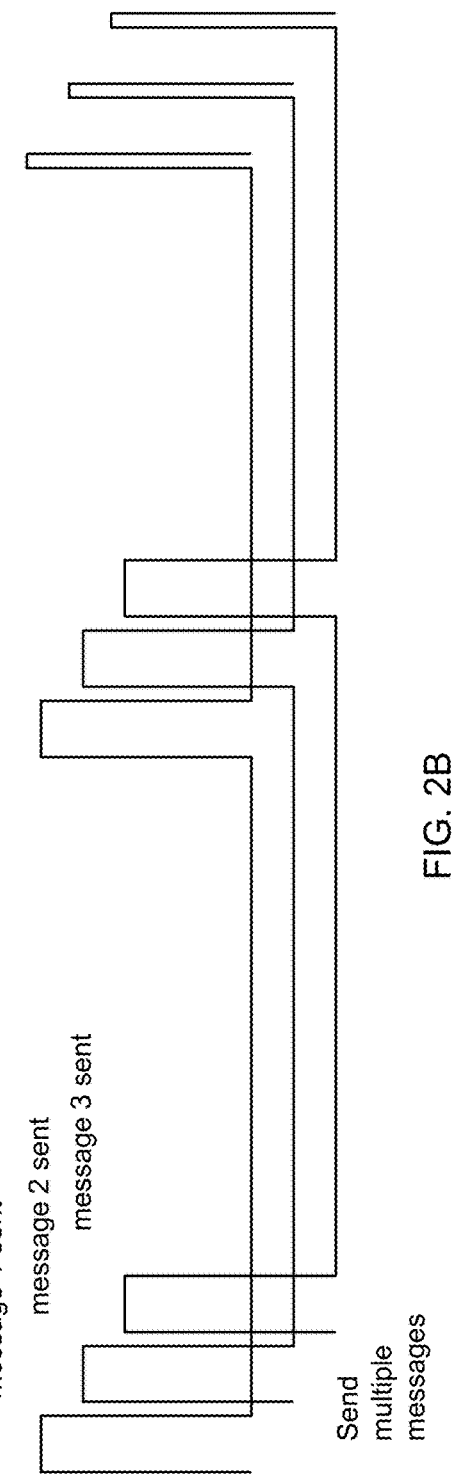
FIG. 2A
FIG. 2B

SYSTEM FOR SUPERMARKET ENERGY MANAGEMENT

CROSS-REFERENCE TO RELATED APPLICATIONS

This application relies on the disclosure and claims the benefit of the filing date of U.S. Provisional Patent Application No. 61/257,685 filed Nov. 3, 2009, the disclosure of which is hereby incorporated by reference in its entirety.

BACKGROUND OF THE INVENTION

Field of the Invention

The present invention relates to the field of supermarket refrigeration & HVAC control. More particularly, embodiments of the present invention provide systems for concurrent and remote management of multiple supermarket refrigeration systems by communicating with different control systems at different locations, translating these various control systems into a single system-friendly generic, format, and making this formatted data available to users without accessing each control system individually in response to a user query. Thus, the invention provides systems and methods for universally, remotely, and/or concurrently managing, monitoring, and/or controlling multiple, and otherwise typically incompatible, legacy and modern supermarket refrigeration control systems in a common operating picture.

Description of the Related Art

Food retailers, especially concerning refrigerated foods, face the difficult challenge of balancing the tasks of providing quality food to their customers, minimizing energy costs associated with maintaining quality product, and increasing or at least not wasting potential profit. Although refrigerated foods are highlighted in this disclosure, the teachings herein are equally applicable to maintaining quality atmospheric conditions for any establishment, such as providing comfortable heating, cooling, safety, and lighting conditions for shoppers, employees, residents, patients, patrons etc. of, for example, shopping malls or other retail locations, office buildings, community centers, retirement homes, and hospitals to name a few. For example, with a single system of the present invention, the control systems that operate the alarm systems, parking lot lighting, refrigeration units, HVAC, and interior lighting systems of every Walmart facility throughout the United States could be controlled, monitored, and managed concurrently.

The digital controls industry, especially as applied to supermarket energy management, is a very fragmented and proprietary market. Control equipment known as Refrigeration Management & Control Systems (RMCS) often varies within a supermarket and/or from store to store at different locations within a supermarket chain. Various legacy control systems include ComTrol, Danfoss EIL, CPC RMCC, and CPC Einstein, for example. Further, the varied methods currently available are traditionally organized around the control systems themselves, along with their communications capabilities, rather than the refrigeration equipment and final products that are the true focus of these management teams.

As a consequence, monitoring and managing the performance and efficiency of the many varied approaches, often even contradictory in their design and usage, is cumbersome, time-consuming, and leads to energy waste. Indeed, in more recent years we as a society have been encouraged to "think green." Further, it is our responsibility as a society to ensure we do not exhaust natural resources to the extent such resources are no longer available for future generations. One way to slow the onset of or prevent exhaustion of earth's resources is to be cognizant of the rate at which we consume these resources and be proactive in finding ways to decrease our rate of consumption.

Supermarkets consume an incredible amount of the total generated power in the United States. With the proliferation of giant retailers across the nation, our energy consumption as a nation has increased tremendously. One reason for this is that with mom-and-pop type stores, energy consumption can easily be monitored and controlled on location, whereas keeping track of energy waste in multiple retail locations becomes increasingly problematic as the number of store locations increases. For example, if it costs $1 to operate the one light in the restroom of a mom-and-pop type shop and it is accidentally left on overnight and throughout Christmas day when the store is closed, the energy consumption consequences are minimal, $1. Compare this with a similar situation in which the ten lights used to illuminate the restroom in a superstore are accidentally left on over the same period and this occurs at 8,000 superstore locations across the country. Suddenly, the cost of the energy consumption jumps to $80,000 for that same period and the corresponding energy consumption consequence becomes astronomical.

Energy waste is also realized when new, better, more energy efficient systems are made available by OEMs but not embraced by stores. Although a supermarket may want the latest, most energy efficient technology, often times justifying, budgeting, and paying for the cost of a new system and the required training necessarily accompanying it prevents these better systems from being installed. As a result, supermarkets get locked in to a specific system for a period of time and do not have a choice about what equipment they can use, and for cost reasons they are forced to keep their existing, less efficient systems in place until the entire life of the system is used up and/or the equipment becomes obsolete. Indeed, most supermarkets have a collection of legacy equipment, some of which works well and is not in imminent danger of being obsolete. Typically, the equipment was modern at one time, bought in an attempt to determine whose equipment provided the best service. With the devices, systems, and methods of the present invention supermarkets are offered the opportunity to bring all of their equipment into one common, highly usable network, and allow for the replacement/upgrading of obsolete equipment in a reasonable and affordable way releasing them from their current captive status, while still retaining the control features of the original unit.

Since a large amount of potentially wasted energy, and a great deal of unneeded service effort is at stake, a consistent method of viewing and managing these stores, especially their RMCS equipment which consume significant amounts of energy, is highly desired. Modern control optimization allows for tremendous energy savings, without sacrificing food quality or safety. Until now, there has not been an easy way to monitor and fine tune a supermarket's cases and power management. With embodiments of the present invention, one universal interface, through a website, provides apples-to-apples comparisons, real-time monitoring and hides the proprietary communication requirements from the user, while taking advantage of the modern capabilities already built into existing controllers. It is estimated that by using the systems of the present invention to manage the energy consumption of chain-type retailers, we could realize a decrease in the national energy budget of about 2%.

SUMMARY OF THE INVENTION

In view of the above-described problems and issues, it is an objective of embodiments of the invention to provide systems for concurrent and remote management of multiple supermarket refrigeration control systems by communicating with the different control systems at different locations, translating these various control systems into a single system-friendly generic format, and thus universally monitoring and controlling the supermarket refrigeration packages concurrently.

The XLT (eXtreme Legacy Translator) system from Zero3 Controls is an answer to this series of problems. The XLT is designed specifically to translate all of the various industry standards and protocols into a common, generic data structure, and to then transmit and present this data in the most efficient manner to the various personnel and organizations that need to use it on a daily and archived basis. Of the various existing legacy control systems, the XLT is compatible with ComTrol (e.g., ComTrol 5000/4000 series), Danfoss EIL, CPC RMCC, and CPC Einstein to name a few. Furthermore, it is possible to build the XLT protocol directly into the different systems or future units so that the systems will be even easier to put on the XLT-based network.

In essence, the XLT on-site computer talks to the legacy system as if it were a human user, sitting next to the controller and constantly asking questions. It takes the data it acquires this way and translates it into a database, a completely common/neutral database that represents a proto-typical supermarket, not wedded to a particular controller. This database is then accessed from the central server by way of the internet. The server waits for a user to request access to a particular site's information, then builds web screens to provide information about the site. These web screens are then passed to the user. The user can access the system using any web browser, such as Internet Explorer, Netscape, Mozilla, etc: to access the information from any store that is on the user's allowed list. This system is extremely legacy neutral and able to work with any existing Original Equipment Manufacturer (OEM).

Benefits of embodiments of the invention allow for the building of futuristic systems with both new and older technology, providing modern management and monitoring advantages while legacy equipment is replaced over longer schedules with rational costing. Further, using random access and commonality, ideas such as global change of lighting schedules, energy optimization, and so on are possible and truly realistic goals.

Embodiments of the present invention provide systems and methods for concurrent and remote management of multiple supermarket refrigeration systems located at one or more retail sites. Such embodiments may include at least one on-site computer, at least one central server, at least one user computer, one or more communication network, and one or more on-site refrigeration control systems.

Typically, the on-site computer is operably configured to communicate with the on-site refrigeration control system(s), which may be the same or different, and multiple on-site computers and/or different store locations may be used.

The on-site computer is capable of translating data received from these various refrigeration control systems into a single system-friendly generic format and the translated data is stored on the on-site computer. This data can be intermittently copied and stored on a central server. Meanwhile, data and more particularly data updates are sent from the refrigeration control system to the on-site computer for storage. At a desired interval, for example every five minutes, the central server detects whether the information on the on-site computer is different from the information on the server. When there has been an update, the server downloads the current information in bulk from the on-site computer.

The information on the central server is then accessed by one or more users to manage the refrigeration control systems, optionally remotely.

In contrast with other existing refrigeration control management systems, systems and methods of the present invention can be used with multiple legacy refrigeration control systems, including old and new versions of a system from one particular OEM provider, and/or different models from one particular OEM provider, and/or different versions or models from several different OEM providers. These systems and methods provide for compatibility between different control systems, which does not currently exist.

Benefits of the inventive systems and methods include being capable of delivering information to a user, in response to a user query, faster than systems in which the user computer communicates with and obtains data stored on the legacy system itself. Also, universal commands to change setpoints or turn off lights across the entire chain with one simple command, regardless of the individual store's controller type.

Embodiments of the invention include methods of managing supermarket refrigeration information systems comprising one or more of: (a) an efficient, generic data structure that can represent any supermarket RMCS operation, or Site; (b) a translation program for legacy RMCS interfaces, which will translate various types of system data to the generic data structure, a cross-platform data structure; (c) a timing cycle that will allow constant interrogation of legacy status, such as temperatures and pressures, and control algorithm status, and storage for logging of this run-time data; and (d) an efficient data communications method, which will allow for concise data drilling in our generic data structure.

In embodiments of the invention, one or more of system components (a), (b), (c), and (d) above can optionally be: (e) contained in an on-site device, known as an XLT, with high-speed network communications capabilities and large storage capabilities.

Additionally, embodiments of the systems can optionally comprise: (f) a central server structure that can maintain constant communication with the XLT (see (e) above) to store static structure and setpoint information about the Site.

System embodiments can also comprise: (g) a central server program that can organize and present static information from the structure in (f) above to programs on web-based display or management systems at much higher speed than if each piece of data had to be retrieved individually from the remote site.

Further features of system embodiments according to the invention, and in particular a feature in the central server program in (g) above, can include: (h) means for retrieving run-time data from the device in (d) above, such as analog or digital temperatures, pressures, amperage and power data in bulk form, increasing efficiency greatly, and then correlating this run-time data with the static structure for presentation.

Additional features of the central server program (g) above can also include: (i) means for allowing any external display or management program to ask questions in a form containing multiple random access questions, and answer them directly in the same fashion.

Another program on the central server (g) above can be: (j) the capability to quickly and efficiently query any or every individual site to determine if any setpoint or structure has been altered, such as on a basis of typically five (5) minute intervals.

An additional feature of the program in (j) above can include: (k) means for pulling back to the central server a new copy of the site data structure, in the event that such change is discovered.

Further additional features of the inventive systems, and in particular of the program (j) detailed above, can include: (l) means for replacing the structure used in (f) above when a new data set is retrieved.

Embodiments of the systems, more particularly of the program (j) above, can include: (m) means for sending an alarm to a monitoring or energy conservation operator to indicate on-site changes have been made that may be unacceptable.

Additionally, systems can include as a program on the central server: (n) means for receiving and recording alarms from each site, indicating some form of improper operation, possibly requiring a service visit by a refrigeration technician.

Further features of (n) above can include: (o) means for repackaging such alarms in various forms, such as Short Message Service (SMS) text messages, e-mail, pager alerts, or others, and means for redistributing these alarms according to the customers desires and needs.

Optionally, in any one or more of the programs of (g), (j), or (n) above or in another program of the inventive systems, features can include: (p) means for operating in a simultaneous and independent fashion, such that said operations are transparent to an operator who may be using the system, and/or using data interleaving to significantly increase efficiency.

A method for commands sent from the central server to be received and executed by each device at each site, translated and executed by each device to take the appropriate action at each remote site.

Preferred embodiments include a system of managing supermarket refrigeration information systems comprising one or more on-site computers for receiving data and data updates from and operably connected with one or more on-site refrigeration control systems. Optionally, the on-site computer has a processor and software for translating the data and data updates into a generic data structure and optionally one or more databases for storing the translated data and data updates.

The systems can optionally further comprise a communication network operably connecting the on-site computers with a central server and for transmitting a copy of each database to a corresponding central server database.

Further optionally, a central server can have one or more databases for storing a copy of each on-site computer database, a processor, and software for: i) repetitively detecting, at a selected timing interval, that the on-site database contains data updates, ii) making a copy of the updated on-site database, iii) replacing the corresponding copy on the central server with the updated copy; and iv) organizing, drilling, and presenting data to a user from the updated copy of the database on the central server, in response to a query of the user, without retrieving the data individually from the on-site computer.

The same or a different communication network can operably connect the central server with one or more user computers and which is capable of transmitting data therebetween.

Any system embodiment of the invention can have multiple on-site computers and multiple on-site refrigeration control systems, wherein each on-site computer is individually operably connected with one on-site refrigeration control system.

Systems can be configured to be compatible with refrigeration control systems with different or the same data structure. For example, the data and data updates from at least one of the on-site refrigeration control systems can have a data structure different from the data and data updates from another of the on-site refrigeration control systems and the processor for translating the data and data updates is capable of translating the different data structures into the same generic data structure.

Also provided are system embodiments, wherein the data and data updates represent one or more of static structure information, setpoint information, and/or run-time information.

The data and data updates in the central server database can optionally comprise current and archived static structure information, setpoint information, and run-time information.

The central server software is optionally capable of retrieving run-time data from the on-site computer in bulk and correlating the run-time data with static structure information stored on the central server for presentation to a user. The information can also be retrieved in piece-meal manner, however, this may not be the most efficient way of retrieving/delivering information ultimately to a user.

The central server software can be operably configured to allow users to make queries in a form that contains multiple random access questions and answers the queries in the same fashion.

The central server software can be operably configured to send an alarm to a user to indicate on-site changes have occurred. These alarms can optionally be recorded by way of the central server software being operably configured to receive and record alarms from each on-site computer for determining whether service to an on-site refrigeration system is needed. The server software can optionally be configured to send the alarms in a customer-desired format, such as Short Message Service (SMS) text message, e-mail, pager, voice mail, facsimile, video, and audio, and send or re-send the alarms in a customer-specified manner, for example, first to e-mail, then to text message, or to multiple users simultaneously by different or the same methods.

The communication network(s) can be for example the internet or internet in combination with a Virtual Private Network (VPN).

Additionally, the central server software can optionally be operably configured to participate in data interleaving to send/receive messages, retrieve data/data updates, send/receive alarms, send commands, and/or transfer data and data updates quickly and efficiently throughout the system.

Methods are also included with embodiments of the invention. Indeed, any method described herein with respect to any system is an inventive method according to embodiments of the invention. Software used in the system embodiments typically employs the inventive methods. More particularly, methods of the invention include methods of managing supermarket refrigeration information systems comprising: 1) receiving information from one or more on-site refrigeration control systems; 2) translating the information with one or more on-site computers operably configured to receive and translate the information into a generic data structure; 3) storing the translated information in one or more databases on or associated with the on-site computer; 4) transferring a copy of the database on the on-site computer to one or more databases located on a central server; 5) polling the on-site computer to determine if an information update has been stored on the database of the on-site computer; 6) upon detection of a change, transferring a copy of the on-site database containing data updates to a database on the central server; 7) optionally replacing the corresponding copy on the central server with the updated copy; and 8) organizing, drilling, and presenting data to a user from the updated copy of the database on the central server, in response to a query of the user, without retrieving the data individually from the on-site computer.

BRIEF DESCRIPTION OF THE DRAWINGS

FIGS. 2A and 2B are flow charts, providing a schematic comparison of traditional timing with that of data interleaved timing.

DETAILED DESCRIPTION OF VARIOUS EMBODIMENTS OF THE INVENTION

Figure 1A:
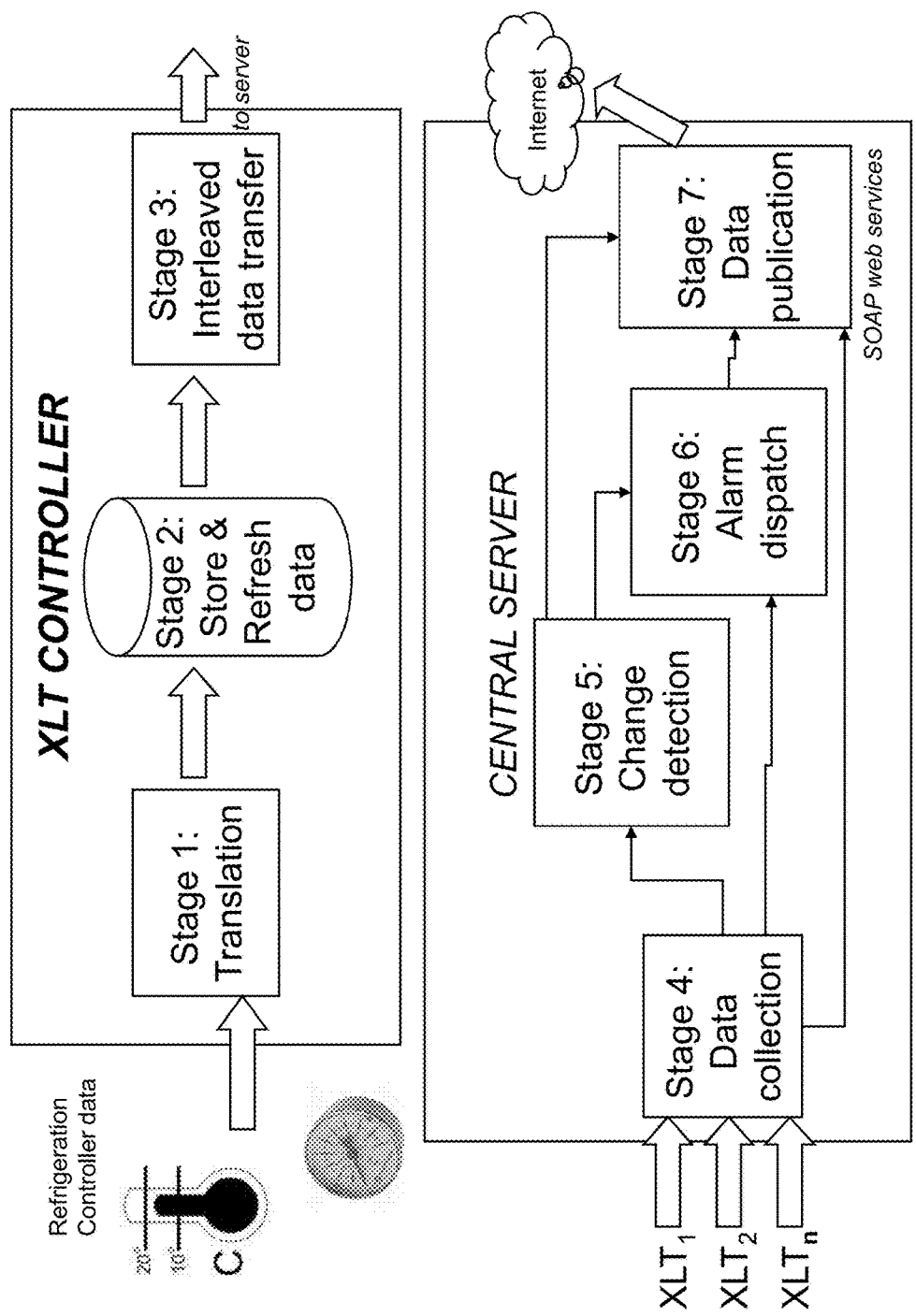
FIG. 1A is a flow chart showing schematically various possible features of representative embodiments of systems and methods according to the invention.

Reference will now be made in detail to various exemplary embodiments of the invention. The following detailed description is presented for the purpose of describing certain embodiments in detail and is, thus, not to be considered as limiting the invention to the embodiments described. Rather, the true scope of the invention is defined by the claims.

Embodiments of the invention include a system of managing supermarket refrigeration information systems. The inventive systems are capable of managing, monitoring, controlling, or otherwise maintaining the control units that are operably connected with one or more supermarket refrigeration units.

Typically the systems can comprise one or more on-site computer(s), which are operably connected with one or more on-site refrigeration control system(s), which are operably connected with one or more on-site refrigeration units, such as a freezer, compressor or refrigerator.

The on-site computer(s) are operably configured to be capable of receiving data and data updates from the on-site refrigeration control system. The on-site computer can have software for translating the data and data updates into a generic data structure and a processor for executing the software. Optionally, the on-site computer comprises one or more databases for storing the translated data and data updates.

Refrigeration Control Management with eXtreme Legacy Translator (XLT)

The on-site computer(s) or also referred to as eXtreme Legacy Translator (XLT) is typically a very small and inexpensive, but very powerful computer, which contains the software, processor(s), databases(s), and overall capability of performing one or more features of the system. In typical embodiments, the XLT can perform up to at least the first three stages of the exemplary seven stage process outlined in FIG. 1A. The stages mentioned herein, however, need not be performed consecutively, can be combined with additional stages, can be used independently or cooperatively, and can be used in any order.

The systems of the invention can be operably configured to perform one or more of the methods (or part(s) thereof) described herein. One part of the method comprises translation of information into a common, generic data structure. This stage is shown as Stage 1 in FIG. 1A, however, according to the invention it is not critical that Stage I necessarily be the first stage of the methods performed by the systems described herein. The information being translated is information relating to set points, size and type, and/or capacity of the equipment (such as temperature settings or interior volume measurements), which are typically static and/or remain static for extended periods of time, and information relating to run-time data, which is typically of a more dynamic nature. Any data, whether current or historic, dynamic or static, can be passed from the refrigeration control systems to the on-site XLT computers.

Legacy control devices of Legacy systems typically employ two essential methods for presenting information (data and set-points) to a user. One such method uses terminal modes, where control devices have software that presents a terminal screen, which can be viewed on simple video terminals, and does not require a computer to access systems, although computers are consistently used for this purpose. A second style is known as a "Protocol" oriented system, where the data transfer to and from the control devices is in a form that is understood only by proprietary programs supplied by the device manufacturers, and that data is then presented on a computer screen. In both cases, the variability of systems, even of different generations of single manufacturers, is immense.

The software for "translating" the data presented in either of these formats, or any other equipment-specific format presented, can employ various techniques for capturing or retrieving the data and mapping it to a generic format. Data inputs to the XLT can be of virtually any legacy-type data format and then translated into a single generic format. For example, data from a first terminal-mode-type refrigeration control system can be input (downloaded, copied, or otherwise transferred and preferably over a communication network) into one or more on-site computer (XLT) and data from a second protocol-oriented-type refrigeration control system can also be input into the same XLT or into another XLT on site. The XLT(s) comprise software and processors for translating the terminal-mode-type information and the protocol-oriented-type information into a single, common, generic format. This translated (also referred to as converted or recovered) information is then stored in one or more databases on the XLTs mapped to a "generic" supermarket model. The XLTs are preferably stand alone unit, discrete, and compact units, but can be configured in any way to achieve similar results. For example, it is not critical that the database, software, or processors physically reside on the XLT so long as these components are, operably connected to the XLT to provide the same or similar function and capabilities. The various techniques to capture/translate data presented by the refrigeration control systems to the XLT computers can include techniques such as so-called "screen scraping" to expert embedded knowledge of more modern protocols.

In embodiments, the XLT's 'generic' model recognizes that refrigeration, hvac, and lighting control in a supermarket is accomplished by a series of quasi-independent computer algorithm 'nodes,' which are referred to as 'functions' by the XLT. These nodes are typically spread over several different RMCS devices, which may or may not be from the same manufacturer. These nodes, for example might be of the type 'suction group', which would control a group of compressors in order to provide proper refrigerant flow in refrigerated cases and/or storage boxes, or the nodes might be 'condenser' type which reject heat from the compressed gas to the outside air, or the nodes might be 'circuit' type which controls the temperature in the product case itself, as well as defrost and other features. Other primary function types are 'hvac', 'lights', and 'anti-sweats'.

The XLT, in a flat database file, can be configured to be capable of maintaining a sub-database for each of 250 of these functions. Each of these sub-databases contain information about the function, such as pressure or temperature setpoints, input and output assignments and usage, structural information, (e.g. compressor count, types, and sizes, defrost and solenoid types, etc), as well as a pointer to the RMCS device that controls that function.

For example, when some remote device or user wishes to interrogate the site XLT for information about the seventh 'circuit' in this store, the protocol sends a request with the parameters 'circuit', and 'seven', along with the specific sub-data required for that circuit, and the XLT can respond appropriately. The circuit may actually reside on the third circuit of controller #2. In the current scheme employed by the industry, the user must figure out which of the controllers contains the desired circuit, then open a channel of communication to that device, then go to the circuit. Since no two sites ever are laid out in the same manner, this typically requires a process of discovery each time research is required, as in example, studying if an alarm is valid or not.

This standardized database format simplifies communication among multiple sites. A standard database gives managers the ability to interrogate the site for elements consistently. For example, a program used to display function lists of circuits at a site might be a generic screen, with simple design. It would start painting the screen with circuit number one, and continue across and down the page. Eventually it will reach the end of the circuits at this site, but it is not required to have any prior knowledge of the circuit count to perform this. When it asks for circuit n+1, where n is the actual circuit count at this site, the XLT will send a response of "NO_EXIST", telling the drawing program it is finished. This feature can exist across lists of functions, lists of inputs/outputs, and other similar features.

With respect to database translation, in embodiments the 'commonality' or 'generic' nature of the XLT database means that disparate approaches to control techniques must be considered in the translation process. As an example, all RMCS systems maintain schedules to determine the actions of various devices under control. ComTrol and DanFoss controllers use a construct that contains a 'time on', a 'time off', and a 'days of week' in each schedule, and these schedules are grouped for the function with a logical or (if any schedule is active, the group is active). CPC systems, however, use a different model, wherein they supply a group of action elements, where each has a time, a days component, and an action (On or Off). There are tradeoffs in each way of scheduling, but in the inventive scheme of commonality, the system can be standardized on the first type, translating all others into a time on, time off, and days of week. In this way, the user does not have to think of the RMCS type in considering changes to schedules.

Another example of translation technique exists in the scheduling used in hvac and lighting on the ComTrol and Danfoss systems. With ComTrol, the schedule 'on' represents 'day' or 'occupied' mode in hvac, and 'on' for lights. However, in Danfoss systems, while 'on' is the same for lights; for hvac, 'on' is an indicator of night setback mode, functionally the opposite of the ComTrol device. The translator must flip the times to accomplish commonality. The complexity of these variations is concealed in the XLT's internal translation process, rendering a standardized view of the supermarkets under any controller.

The data stored on the on-site XLT is optionally operably configured to and connected with the refrigeration control system(s) to constantly retrieve (e.g., systematically and periodically at desired timing intervals) run-time data, to regularly re-visit the set-points on the control devices, and to archive these values for historical performance purposes. The result is a simple flat-file database of set-points, an archive of previous configurations, and a history of run-time data. An example of this portion of the method is referred to as Stage 2 in FIG. 1A, yet as with any stage of the methods this stage need not necessarily be the second stage nor performed after translation of the data. For example, it is possible that the data can be imported to the XLT, stored thereon (which includes storage on a device operably connected with the XLT), and then converted/mapped to a useable data structure. Although storing the information prior to translating it and then translating the data upon moving it to another location in the system is possible, but may not be the most efficient way of handling the data. Additionally, the XLT optionally comprises the ability to rapidly respond to real-time requests for current runtime data (for example, in conjunction with Stage 4).

Another optional feature of the XLT on-site computer is the ability to transfer information, especially upon user requests for data, quickly and efficiently. The XLT can comprise software and/or be operably configured to perform functions of Stage 3, as is further shown in FIG. 1A. In one example, the information from the XLT can be transferred to remote sites where it can be used and/or presented to a user. This protocol can be operably configured to be oriented around the generic database structure and as such allows for use of the data without any respect to which type of refrigeration device, or which type of data presentation protocol used by those devices, is being used for control. The protocol is preferably designed as an internet application, with multiple ports under ethernet, such that a great deal of interleaving makes the process much more efficient. This protocol allows for specific answers to specific data, without having to go through a delaying "Log On" process, and with minimalist timing. Another feature of Stage 3 is the capability of pushing alarm data to the central server.

The communications protocol used in embodiments of the XLT uses a simple concept: No more than five variables are required to drill to any value in the database or runtime fields. These five fields are 'Object' 'Object Index', 'Item', 'Item Index', and 'Property'. 'Object' includes such things as 'Suction Group', 'Circuit', 'Lights', 'Analog In', 'Store Hours', an so on. 'Object Index' is just the instance of the object, e.g. 'Suction Group', 'Two'; 'Circuit', 'Seven'; 'Analog In', 'Twenty-three'; and so on. 'Item' is basically what about that object you want to know, such as 'PSI Setpoint', or 'Hot Gas Offset', or 'Defrost Time'. 'Item Index' applies where there may be more than one of the item; for example 'Defrost Time' has six possible times, 'Case Probe' in 'Circuit' has sixteen possibilities, although seldom are all sixteen implemented. Finally, 'Property' designates what piece of data about that item is requested. For instance, with an 'Analog Input', properties might be 'Current Value', or 'Type' (Pressure Sensor, Temp Sensor, Liquid Level Indicator, etc), or 'Offset', which is used to fine tune inputs, or 'Name'. With these five variables, and a consistent framework for transmitting and expressing them, any value on the XLT may be obtained quickly and simply.

One interesting feature of a scheme such as this is there are multiple pathways and redundancies built into the system. For instance, a query could include 'Current Value' (Property) of 'Suction Pressure' (Item) on the 'Second' (Object Index) 'Suction Group' (Object). However, for other valid purposes, a query might ask for the 'Current Value' of the 'First' (Item Index) 'AIN' (Item), on the 'Second' 'Suction Group'. Both of these requests would end up at the same data. Finally, another query might ask for the 'Current Value' of the 'Seventh' (Object Index) 'Analog Input' (Object) on the entire site; and on this site, that would lead the user to the same data.

With most values to be obtained, the only property usable is the current value, but for certain items, multiple properties are associated, such as: 'Offset' for Analog Inputs and Outputs; 'Inversion' for Relays and Digital Inputs; and 'Time On', 'Time Off', and 'Days' for schedules.

In embodiments, the XLT uses two different methods to implement this protocol stream over an ethernet connection. The values can be sent and received in a binary form, with one question embedded in each UDP/IP packet, with a return packet expected in binary form, whether a valid value, or a code for NO_EXIST. It is the responsibility of the requesting party to understand the binary form of the answer, and to use it appropriately. Contained within the protocol structure is a password value, which is an algorithmic value based on several factors which are discoverable with the correct formula. The basic concept is that data can be read without a password, but the password must match to alter data.

Another protocol implementation method takes the scheme above, but expresses it in a text form in the basic methodology of the HTTP Get request, in an Extensible Markup Language (XML) form. This is an open protocol, published by Zero3, so that other software products can interface cleanly with the XLT. In this method, using TCP/IP, the user builds an XML file containing several requests (Limit 70 in each XML packet). There are some very important advantages to such a scheme. The most visible is this: In a given user screen, the requirement might be for 37 values to build the screen. If it is assumed that the turn-around time for each packet is 60 milliseconds, it will take 2.22 seconds to acquire the pertinent data, a somewhat acceptable time for building a screen. On the other hand, if the site is in Melbourne, Australia, and the user is in Baltimore, Md., that same packet time now likely expands to 800 msec, and the screen build goes from 2.22 sec to 29.6 seconds, which is wholly unacceptable. However, one little known fact about the Internet is that within certain bounds, packet time is almost totally unaffected by packet size. Therefore, using the XML format, where all 37 questions are asked and answered in one single packet, the user can get required screens back in 800 msec, well inside our comfort zone, even for Australia.

Refrigeration Control Management with Central-Server Configuration

The systems and methods of embodiments of the invention can optionally further comprise a communication network, which is operably connects the on-site XLT computers with a central server. A copy of each database on the on-site computer can be transmitted by way of the communication network to the central server. The database from one on-site computer can be downloaded or copied to one or more central servers, preferably by using the communication network or any other means of transferring the information. The databases (or part or all of the information therein) from the on-site computers, especially where numerous databases from numerous on-site computers are involved, can be downloaded, copied, or otherwise transferred to one or more databases on one or more servers. It is not critical the exact configuration of this portion of the system, so long as information from the on-site computer at some point resides in whole and is stored on the central servers, either temporarily or permanently. Further, it is not critical that the information, software, or processors for this task physically reside on the central server. Such parts of the system can physically reside on another component of the system and be operably connected to provide the same or similar results as if physically on the server.

The remaining four stages of the process and systems (all, some, or none of which can be used) according to embodiments of the invention typically and preferably but not necessarily take place on or in conjunction with or in connection with the central server.

One or more central server can be used. The central server(s) (which includes system configurations where similar equipment is not located directly on the central servers but rather is located on equipment that is operably connected with the central servers to provide the same functions) have software and a processor for executing the software for: i) repetitively detecting, at a selected timing interval, that the on-site database contains data updates, ii) making a copy of the updated on-site database, iii) replacing the corresponding copy on the central server with the updated copy; and iv) organizing, drilling, and presenting data to a user from the updated copy of the database on the central server, in response to a query of the user, without retrieving the data individually from the on-site computer.

As shown in FIG. 1A, Stage 4 is a data gathering tool that can be performed on the central server. As with each other portion of the systems and methods described herein, this stage can be combined with other stages (with some examples shown in FIG. 1A), used independently, or used in any order with any other stage. This data gathering tool may be operably configured to support several other functions or features.

In any graphic presentation process, and in many data analysis methods, the majority of data needed is structure information that does not change from minute to minute, or for that matter, from week to week, such as how many compressors are in a given store, or the horsepower rating of each compressor. To require the presentation program to go back to the XLT at the refrigeration site for this kind of data each time it needed to draw a screen would be incredibly wasteful of resources, and much worse, would severely degrade presentation performance. Therefore, it is preferred that the system maintains an exact copy of the XLT database for each site and maintains the information on the central server. Such a configuration will allow for high speed access to this type of information. Unlike systems which update the local database only when a user logs in, presenting the user with "Please Wait While Loading" messages; the XLT loads databases in the background whenever it discovers changes have been made or the data has been updated. Advantages of this system can be realized both in response speed and in central awareness of any changes. Another feature of this portion of the process is that the data gathering tool can be configured to collect runtime information in bulk, at high efficiency, when a user starts requesting screens. This feature is also optionally operably configured to be capable of providing answers to individual requests, such as the current temperature at Circuit D1-32, the Fresh Meat case, for example.

FIG. 1A further provides that for an XLT (or multiple XLTs ($XLT_1$, $XLT_2$, . . . $XLT_n$)), the data that is received from them and stored on the central server can be compared with the information stored on the corresponding XLT to see if data updates have been transferred from the refrigeration control system to the XLT. This is referred to as Stage 5 in FIG. 1A and can be used as an independent application or in combination with any other method steps. This comparison can be made in any way. One such way would be by comparing related individual values in the corresponding databases, however, this potentially would require tremendous computing resources and involve extensive amounts of time. Another way to determine if the databases contain different sets of information is to use a comparison tool that constantly checks (e.g., at various predetermined timing intervals) one number in the remote XLT database and compares this number with a corresponding number in the central server database. This number represents the last time an update was detected of any configuration change within the database. If this number is different in the database on the server from the remote number (the number on the on-site XLT computer database), then a new database needs to be downloaded to the server from the XLT.

Facilitated by constant interne connectivity, this database download takes place in the background, whether a user is online or not. Since the time involved in retrieving the number from the remote XLT is a matter of 30-50 milliseconds, and ten to twenty requests can be processed in a simultaneous fashion, approximately one thousand sites can be queried in 5 minutes, without affecting any users currently accessing the system.

This reduction in latency of the knowledge makes it possible, for example, to detect that a mechanic has made a likely undesirable change to the site, affecting energy consumption. This method constitutes information changes constantly being pushed to the central server, versus the traditional "pull" method in a lengthy process of establishing communication with each individual store, downloading its entire database, and scanning for changes at a central monitoring facility. Thus, the XLT gives management a fast, efficient, and reliable, real-time tool to maintain the highest operational efficiency.

Another feature of systems and methods according to the invention includes an alarm tool for relaying condition alarms initiated at any operational site. This tool is exemplified as Stage 6 of FIG. 1A, and can be used alone or in combination with other stages. Preferably, this alarm dispatching tool runs on the central server (e.g., by way of software and a processor for executing the software, which may or may not physically reside directly on the server). The alarm dispatch tool can be built (e.g., operably configured) to receive and then re-dispatch any system alarms occurring at any site within the system. Commercial refrigeration systems are notoriously trouble prone, and timely response to alarms is critical to both cost of operation and safety of the refrigerated food products. Alarms can be sent to the central server using the protocol (or a similar one) described in Stage 3, for example. In Stage 6, these alarms are pushed through a customer indexed system that determines the customer's desired destination(s) for alarms, as well as their method of delivery. Again, this preferably happens in an interleaved fashion, potentially happening while a user is on-line, looking at a store, with no disruption of the user. This innovation in and of itself provides great value as compared with modem-based systems, which are incapable of multitasking and, therefore, frequently cause dropped alarms when the system is elsewise engaged.

FIGS. 2A and 2B provide schematics to compare traditional communications methods with an underutilized internet communications feature known as interleaving, which Stages 4, 5, and 6 can each be operably configured to independently leverage. When messages are sent out on the internet, they hop from one router device to another until they reach the destination. Typically, it can take 100 microseconds to send a message at the local computer, then 30 milliseconds to get to the destination, 100 microseconds at the destination to process an answer, and 30 milliseconds to return. This totals 60.2 milliseconds. In contrast, with interleaving, after the 100 microsecond sending of the first message, the second message takes another 100 microseconds, and a third takes another 100 microseconds, so the three packets transfer in 60.6 milliseconds. If the system is designed properly to take advantage of this approach, this type of action significantly enhances the process operation by not waiting for one packet to return before sending the next packet. As a result, using a multi-port approach can increase access speeds by four to ten times that of existing control management systems.

The central server preferably employs and/or is operably configured to provide data output from the system in an industry-standard Open protocol. As shown in FIG. 1A, Stage 7, which is typically the final stage, makes all the site data available in an industry standard Open protocol, and receive back open-protocol commands, such that other companies can use the XLT system to provide a platform for value added approaches. Such value added approaches can include expert systems to evaluate alarm data automatically, or energy optimization management programs, without respect to the controller type, which provides a significant advantage to managers of these systems. Software developed for Stage 7 preferably provides a library of server functions in the Simple Object Access Protocol (SOAP), making extensive use of eXtensible Markup Language (XML) to provide industry-standard web-services across many platforms. Such a configuration makes it possible for the XLT data to be integrated with energy, weather, power plant and other data.

Figure 1B:
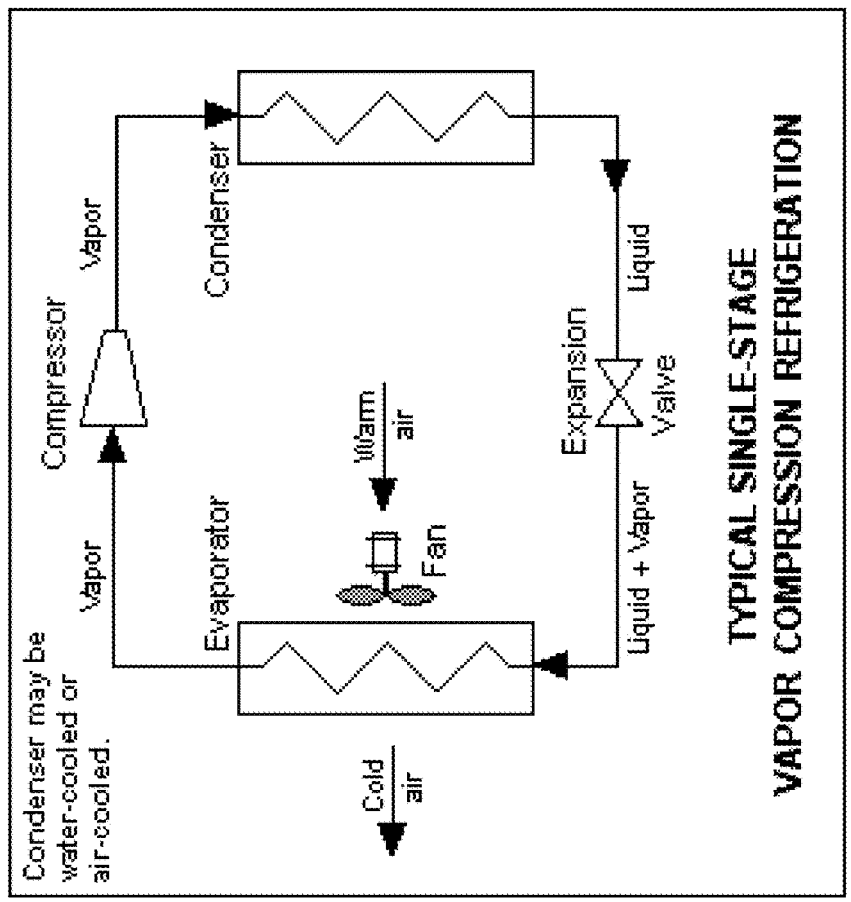
FIG. 1B is a schematic showing a representative system that can be controlled by the control system shown in FIG. 1A.

FIG. 1B provides a schematic of a representative system that can be controlled using embodiments of the invention, including those described in FIG. 1A. FIG. 1B shows a typical single-stage vapor compression refrigeration system controllable by systems of the present invention.

System Configuration with XLTs Translating Multiple Legacy Systems

Figure 3:
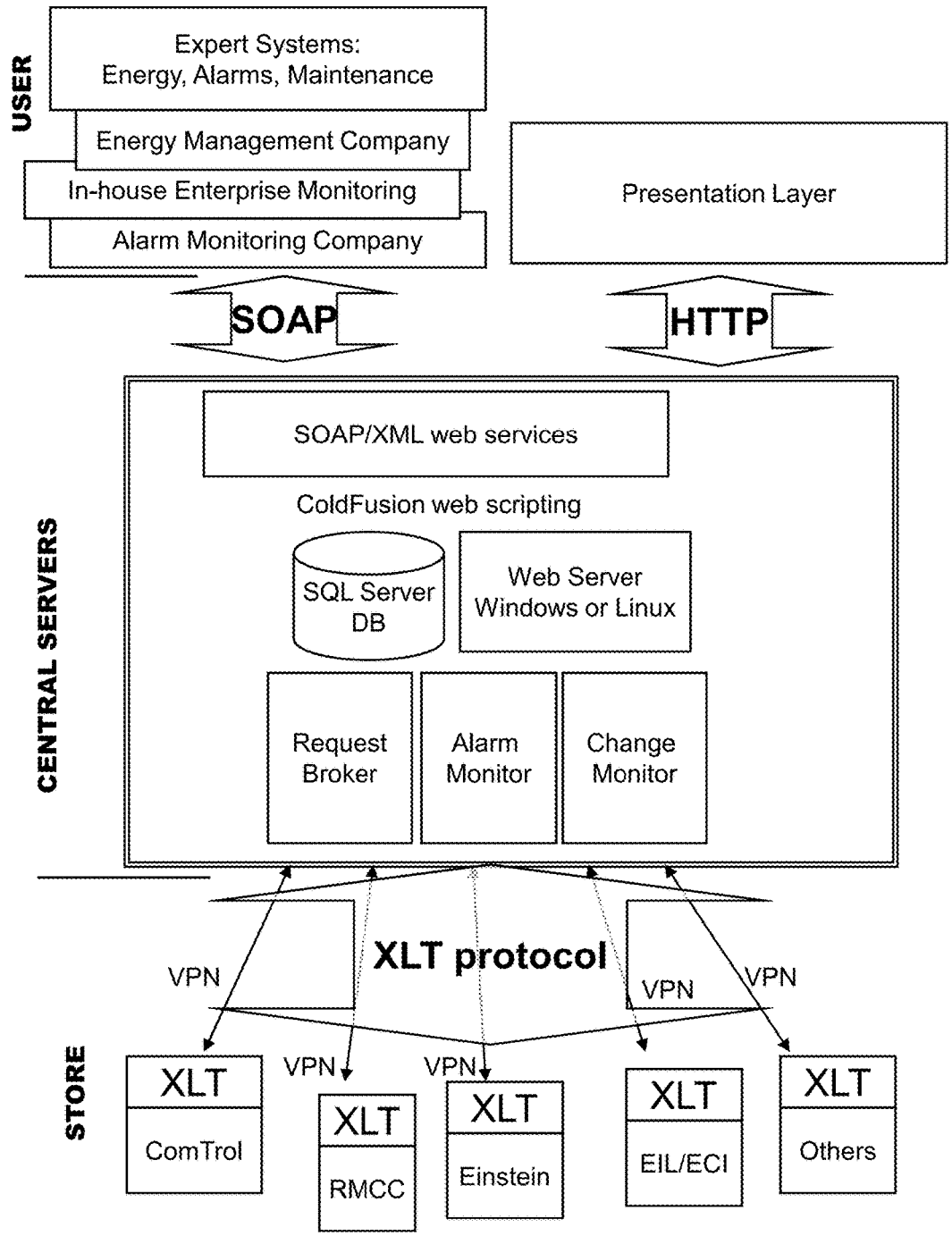
FIG. 3 is a flow chart providing a schematic representation of an exemplary embodiment of the systems and methods according to the invention.

FIG. 3 provides a schematic representation of another exemplary embodiment of the systems and methods according to the invention. As shown in FIG. 3, multiple XLTs can each be operably configured to receive and translate data from a different legacy control system. As shown, $XLT_1$ can be operably connected with a ComTrol system, $XLT_2$ can be operably connected with an RMCC system, $XLT_3$ can be operably connected with an Einstein system, $XLT_4$ can be operably connected with and EIL/ECI system, and so on. The XLTs can be located at one site or at multiple sites. The XLTs can be operably configured to receive information from one or more refrigeration control systems, and/or one or more lighting control systems, and/or one or more HVAC control systems, and/or one or more security control systems, and so on. In a particular example, the system can be operably configured to receive and translate information from one or more different and usually proprietary control systems.

The XLTs in the system are one or more on-site computers for receiving data and data updates from and operably connected with one or more on-site control systems (such as one or more refrigeration control systems). Each XLT on-site computer has a processor and software for translating the data and data updates into a generic data structure. The processing capabilities and the software of the XLT are preferably physically located on the XLT but can also be operably connected with the XLT and reside elsewhere. Also it is not critical the type and number of processors and software that are used in connection with the XLTs, and this factor may depend on particular control systems being input into the XLT system. The XLTs comprise one or more databases for storing the translated data and data updates. Typically, the XLTs and the control systems are physically located at the store site, however, any other configuration is possible so long as the XLT and control systems are operably connected. Additionally, it is not critical that the XLT and control systems are hardwired for connectivity and wireless configurations are also possible.

The information being managed by the XLT system can include data and data updates representing one or more of static, or dynamic, or semi-static, or semi-dynamic information. For example, static structure information (such as the number of compressors in a store, horsepower rating of each compressor, etc.), setpoint information, and run-time information can be collected from the refrigeration control systems, transferred to the XLT and stored, then transferred to the central server for duplicate storage. The data and data updates in the central server database can comprise current and archived information.

Once the data from the control systems is translated by the XLT, the data is then stored on the XLT on-site computer, preferably in a database. The data can then be transferred to one or more central servers across a network (e.g., VPN) by which the XLT and central server(s) are operably connected. The XLT protocol for handling the data storage and transfer can be a unified, open, compact UDP protocol. This data is stored on one or more databases of the central server(s), either individually or in bulk. For example, a copy of the XLT database can be transferred as a unit for storage on the central server(s).

The central server(s) manage the information in several ways, including using a request broker, alarm monitor, and/or change monitor functions as is shown in FIG. 3. The central server(s) are equipped with or operably configured or connected with other equipment or hardware and software to provide database(s), a processor(s), and software for one or more of the following to be performed in any order and/or in combination with other activities: i) repetitively detecting, at a selected timing interval, that the on-site database contains data updates, ii) making a copy of the updated on-site database, iii) replacing the corresponding copy on the central server with the updated copy; and iv) organizing, drilling, and presenting data to a user from the updated copy of the database on the central server, especially when in response to a query of the user, and without retrieving the data individually from the on-site computer.

The change monitor, or software in combination with a processor for detecting data updates have been made on the XLT, can perform its functions using a process of highly interleaved communication with the XLTs. This provides for efficient and fast retrieval of information, as the server can be monitoring several XLTs simultaneously at various intervals. As compared with other remote monitoring systems, the systems of the invention that use interleaving for communications between the server and the XLTs can perform functions without the user being aware the functions are being performed. For example, in existing systems when a user logs onto the system a delay in processing will be noticed by the user, which is typically coupled with a note to the user that the system is loading information for the user. Thus, in existing systems the information needed by the user is provided from the legacy system itself rather than from a central server.

The servers can be operably connected with and configured to communicate with one or more user computers in the system. Numerous web services can be employed by the servers to perform communications with users over the internet or the internet in combination with a VPN or other secure network. For example, a SOAP architecture can be used between the servers and users which are one or more of expert systems (e.g., energy, alarms, and/or maintenance), an energy management company, an in-house enterprise monitoring, or an alarm monitoring company, and which typically use .Net-, PHP-, ROR-, HP OpenView-, Python-, ColdFusion-, etc. based services. An XML-based protocol can be coupled with HTML and Flash presentation layers. The communication networks connecting the servers to users and the XLTs can be of any type. Internet TCP/IP can be used for authenticated, open architecture communication. Further, if preferred, a J2EE platform can be used for high-level customization and new SOAP Web Services.

Embodiments of systems according to the invention can be configured to allow users to make queries in a form that contains multiple random access questions and answer the queries in the same fashion. Accordingly, data can be collected in small pieces, without going through multiple user interface screens. This will provide systems with higher reaction speeds and even faster processing times when combined with data interleaving as well.

Embodiments of the present invention provide an Expert System approach to dealing with site alarm monitoring & maintenance. In the current and legacy RMCS systems, about 60% of alarms turn out to be false, or repetitive, or unimportant. But training humans to deal with this is not only problematic, it is expensive. The Expert System is capable of receiving an alarm with a computer, then performing a healthy amount of decision making prior to calling in the efforts of a human operator. This decision process is based on the collective wisdom of a reasonable group of highly experienced refrigeration/HVAC techs, distilled into code, or rules. To make this practical, there must be real-time communication with the site allowing small random access questions at high speed.

As an example, without using the systems and methods of the present invention, assume an alarm is received from Site DCA117 where the third circuit, fifth probe, has a temperature above alarm setpoint. An operator deals with the alarm, decides what software to use (30 seconds) calls back the store (1 minute), walks through 3-5 screens (1 minute), then studies circuit screens (1 minute) to determine if the case is slowly recovering from defrost or is there is a real problem. Based on results, the operator may or may not call the store and/or its service contractor. The result is that the response time is about 3-5 minutes with most of the process dependent on operator decisions and training.

In contrast, with the XLT's random access based protocol, when an alarm arrives, it contains protocol data to access the circuit in question, without going through setup screens. Before handing the alarm to an operator, the receiving computer goes directly to the site in question (10 milliseconds) (or accesses a copy of the most recent information stored on the server), asks for last defrost termination time (about 60 milliseconds), current value or probe (about 60 milliseconds), setpoint of the circuit (about 60 milliseconds), and probe trend (about 60 milliseconds). Using this data, the receiver may choose to check back 5 minutes later, before involving an operator. It may decide to pass the alarm to an operator immediately. It may decide to call this a false alarm, and just toss it into a recorded bucket. It is called an expert system, and it takes about 240 milliseconds to make a decision based on rules established by the best service people around. When and if the alarm is passed to an operator, the pertinent data is painted on his right hand screen as fast as the site data paints on his left (5 seconds), along with an action plan to follow in resolving the problem or issue.

The key to this operation is the random access and commonality discussed herein. If an Operator must dial up, then log-in, main menu, secondary menus, etc. before getting to the heart of the matter, efforts bog down quickly. Also, if there is a different series of operations for Danfoss or CPC or ComTrol, the rules become too complex to manage effectively. In the scenario above, the management system might be monitoring 5,000 sites concurrently, and these questions need to be answered in milliseconds, so we can get on to the next site doing the same thing. Further, the inventive systems and methods can look at the past, see this has happened every third day for three weeks, and send a notice to Site Efficiency Operations, such as "you should look at this."

The central server can be operably configured to perform alarm monitoring functions to ensure that a notification of corrective action is provided, if needed in response to a particular undesired situation. In embodiments, the central server software is operably configured to send an alarm to a user to indicate on-site changes have occurred, such as a technician has changed certain setpoint data or that the current operating temperature for a food storage case is higher than the desired setpoint temperature. In such a situation, it may be that the door for the food storage case was left open accidentally and the unit is operating at a much higher level than is needed in an attempt to keep the food within the storage case cold. Additionally, the central server and corresponding software can be operably configured to receive and record alarms from each on-site computer for determining whether service to an on-site refrigeration system is needed.

Figure 4A:
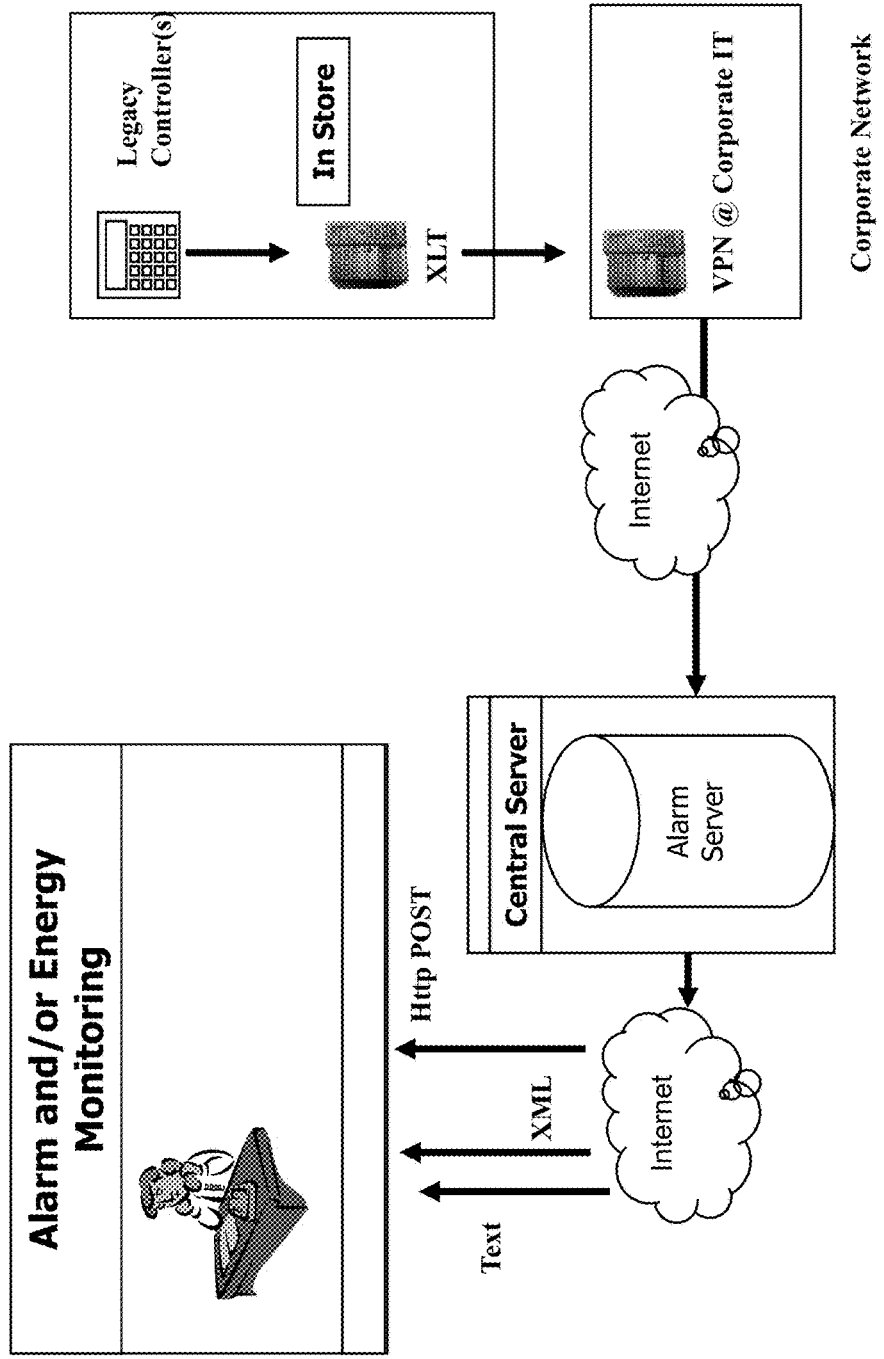
FIG. 4A is a flow chart providing a schematic representation of an exemplary embodiment of the systems and methods according to the invention.
Figure 4B:
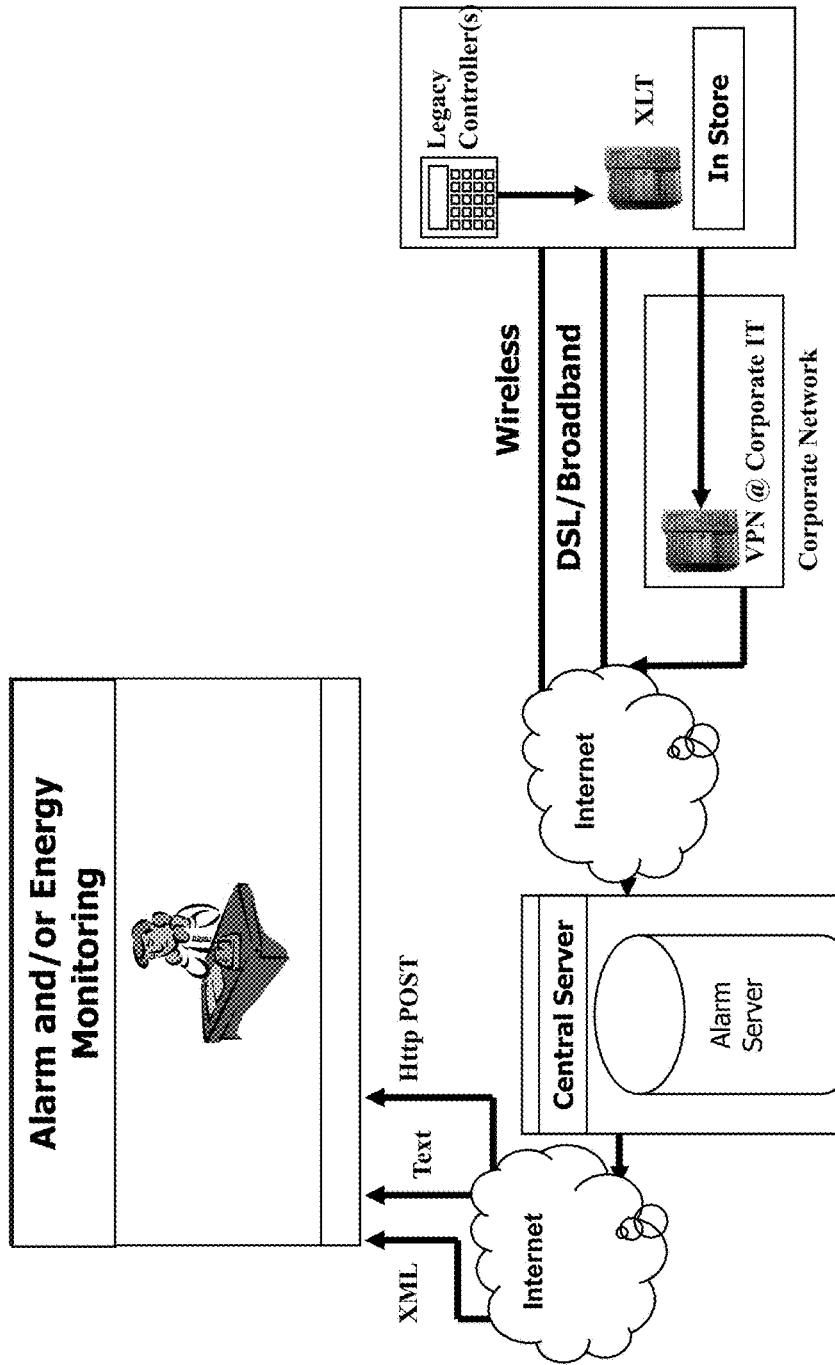
FIG. 4B is a flow chart providing a schematic representation of variations according to the invention of for example the embodiment shown in FIG. 4A.

As shown in FIGS. 4A & B, the devices, systems, and methods of embodiments of the invention can be configured in various ways and can be configured to provide alarm monitoring capabilities, for example, to monitor changes in setpoints and energy consumption. As shown in FIGS. 4A & B, one or more Legacy control systems on site in a store location can be operably configured and connected with an on-site XLT computer, which can be operably configured and connected with a central server. Information can be passed from the Legacy controller to the XLT and to the server over a network. Three common methods of connecting over a network include installing the package on an in-store private network, then a VPN or bridge is installed at company headquarters. Alternatively, a DSL line can be installed in the store or a cellular Ethernet modem can be used to avoid any wiring issues. The central server can be operably configured with software and corresponding processing means to determine if an alarm should be generated. If an alarm is generated, the alarm can be sent over the internet to a user who is monitoring alarms, energy consumption, and setpoints for the equipment. As is further shown, alarms generated by one or more of the alarm monitoring functions of the system can be sent in numerous ways. For example, the central server software can be operably configured to send the alarms in a customer-desired format and send or re-send the alarms in a customer-specified manner. The customer-desired format and manner can be any one or more of Short Message Service (SMS) text message, e-mail, pager, voice mail, facsimile, video, and audio, or any other desired format capable of being operably configured with the system, such as any text-based, XML-based, or Http POST-compatible format.

In any supermarket chain's information technology (IT) department, the second highest priority, right behind functionality, is data security. It normally functions on a closed, private network, and the gates are guarded with a great deal of zealous intensity. The latest advances in store energy management require a bridge that will allow monitoring companies, energy service bureaus, and so on (as well as many ordinary mechanics) access across these networks to the energy controls at each site.

Figure 5A:
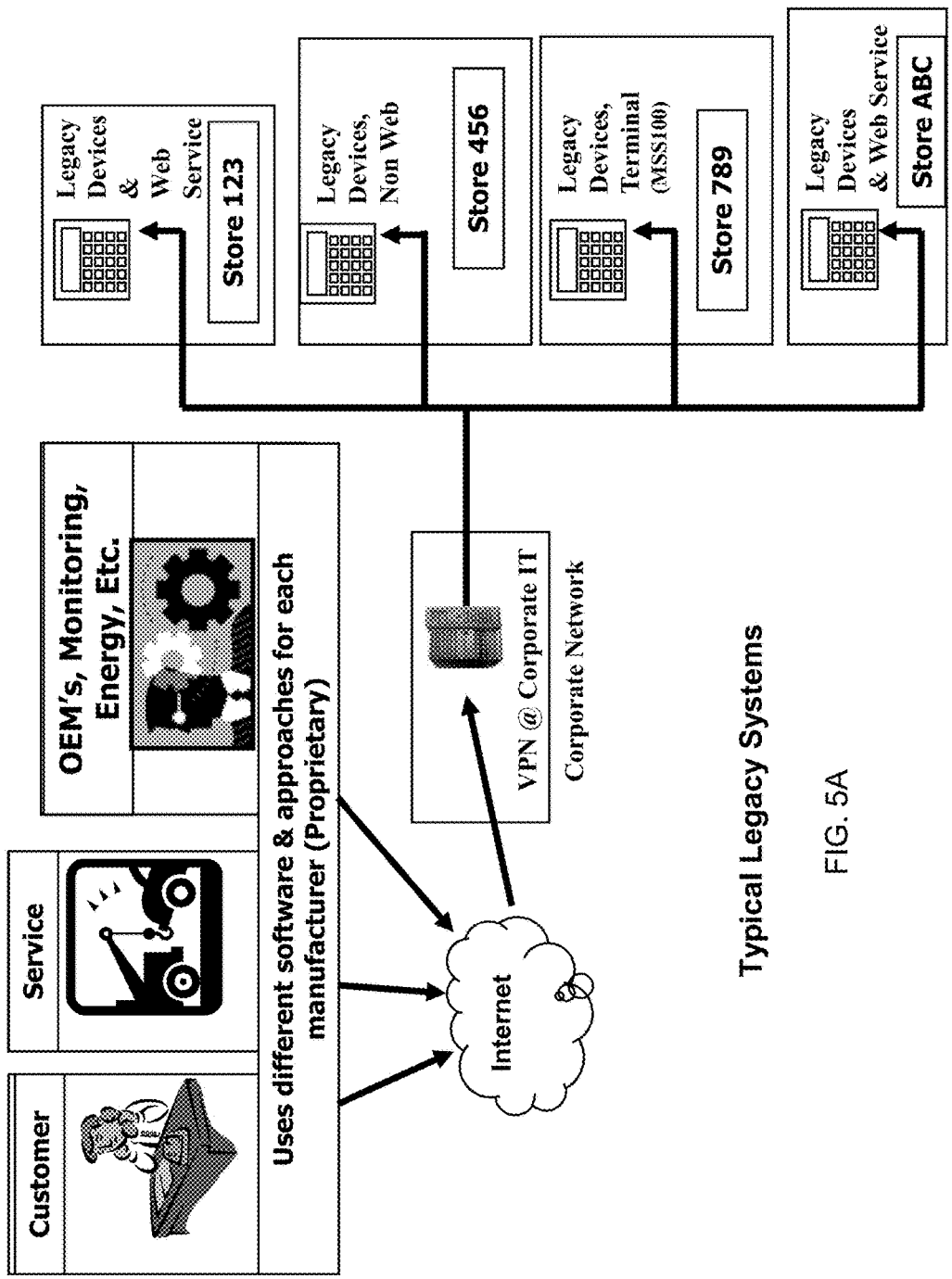
FIG. 5A is a flow chart providing a schematic representation of a typical legacy control management system for comparison with embodiments of the invention.

In FIG. 5A, this type of situation is outlined. Legacy devices provide some security (user passwords, etc.) and in some systems provide web service over the corporate network. VPN provides another level of security, allowing users and/or sites with a variety of techniques, like defender cards, passwords, etc. All are cumbersome, and require constant supervision of IT personnel. Different sites require different techniques, bandwidth, ports, etc. There is very little consistency or commonality among the controller vendors.

More particularly, in this embodiment, as shown, four Legacy control systems at four different store sites can be managed with a single XLT-based system. In this embodiment, store ABC houses legacy devices configured to operate with a web service, store 789 houses legacy devices that are terminal-based devices, such as MSS100, store 456 houses legacy devices that are compatible with non-web platforms, and store 123 houses legacy devices with web service. To obtain information about a legacy system in the management system, the users must communicate directly with the desired legacy system and in a format that the legacy system understands. For example, customers, service personnel, alarm monitoring users, energy management personnel, original equipment manufacturers (OEMs), and so on, may each need different software and a different approach to obtain the information about the legacy system that is only relevant to them.

Because there is no common, generic format for the data of the different legacy systems to be converted into, each user must communicate with the legacy devices to obtain the desired information. Typically, in such situations a user when accessing the system will have to wait for a connection to be made with the legacy system before being able to communicate with the system. Every user must go through this process individually, which is both time consuming for the user and a drain of the system resources. Indeed, if there are too many users accessing the system, each may have to wait for another to finish before another user can access the same information. Another disadvantage to these existing management systems is that the users communicate directly with the legacy system itself each time they request data. Even though there is a VPN, which provides some level of security for the system, allowing a large number of users to communicate directly with the legacy equipment will increase the potential risk of a system security breach, thereby putting the legacy systems and the data stored thereon in jeopardy unnecessarily.

Figure 5B:
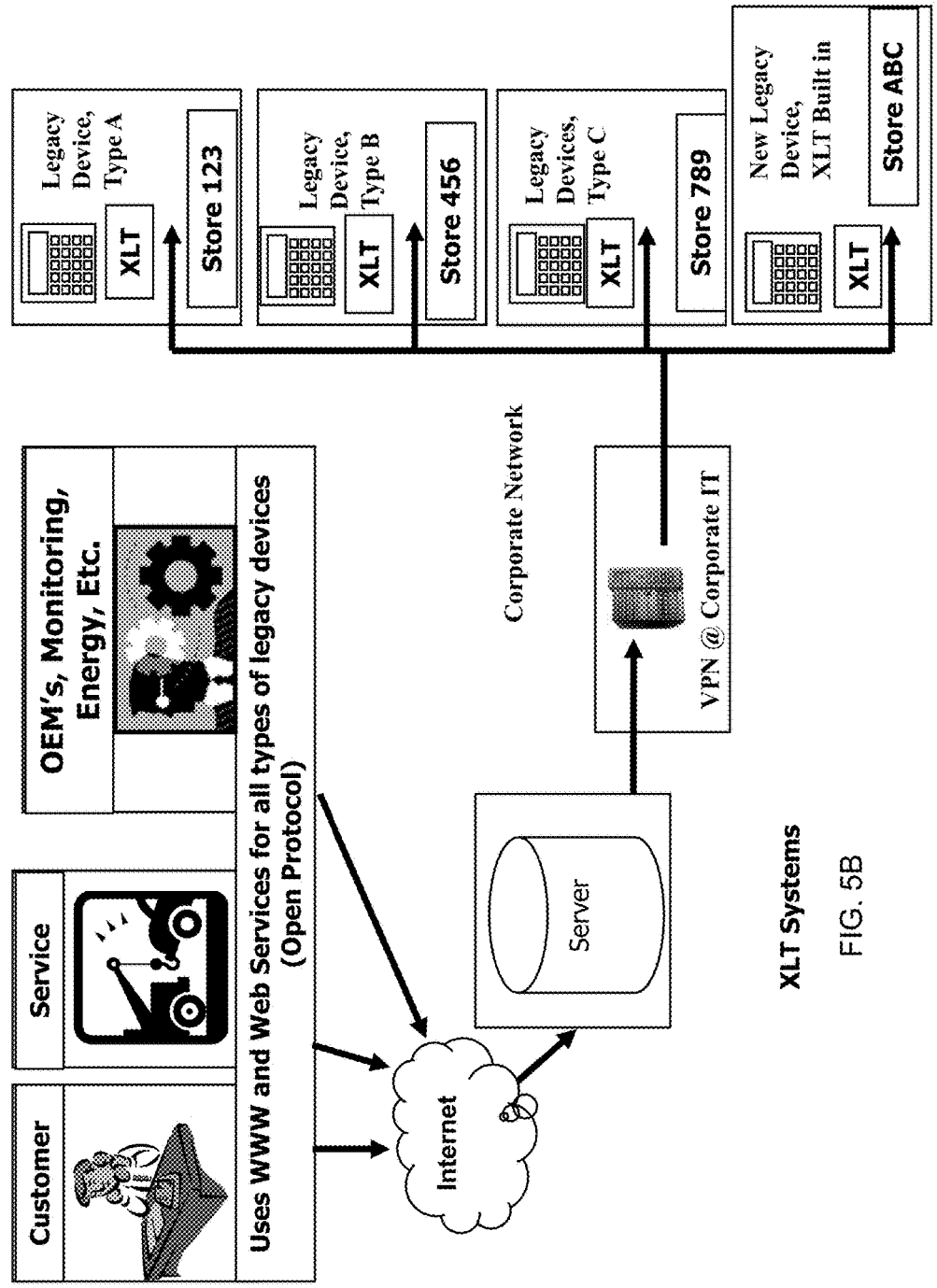
FIG. 5B is a flow chart providing a schematic representation of an exemplary embodiment of the systems and methods according to the invention.

In contrast, and as provided in FIG. 5B, embodiments of the invention can comprise means for insulating the legacy control systems from possible security breaches. Legacy devices are insulated by the XLT on-site computer, which translate all the different legacy approaches into a common UDP/IP format. This 5-port UDP protocol travels only to the central server through the corporate VPN. The VPN's job is very simple. The VPN only responds to one IP address, and only UDP on the 5 ephemeral ports at that. The user is never allowed directly on the corporate network, so hacking is virtually impossible.

Additionally, multiple users can access data from multiple legacy control systems concurrently without draining resources of the management system. For example, it is possible with embodiments of the invention for 25 to 30 users to look at information from the same site at the same time without encountering annoying busy signals.

Further, all or some of the web screens and web services can be managed on the central server(s) at one location. The database on the central server can be held in a common format for all sites, and is accessible by OEMs by way of a standard open protocol SOAP web portal. Multiple users at any one time can access the web server without affecting traffic over the store network. All users can be verified and managed as to allowance and access level on the central server, making system management a realistic job to outsource or to manage locally.

Even further, OEMs may decide at some point in the future to change the protocol that is compatible with their legacy control system. This has happened many times in the past. Under current management systems where each user accesses the legacy system individually, each user computer will need protocol updates and each user will need training on the new software and possibly new user interfaces as well. Such changes are often postponed by stores until the need is so great that the cost burden is outweighed. It is possible under embodiments of the invention, however, minor changes to the XLT translator protocol can be made to accept the new OEM changes without the user even noticing the change. This is because the way the user accesses the information (by way of accessing a common data format on the central server) will remain the same. As a result, stores can take advantage of new OEM updates without incurring substantial costs in re-training personnel and replacing user equipment and software.

Figure 6:
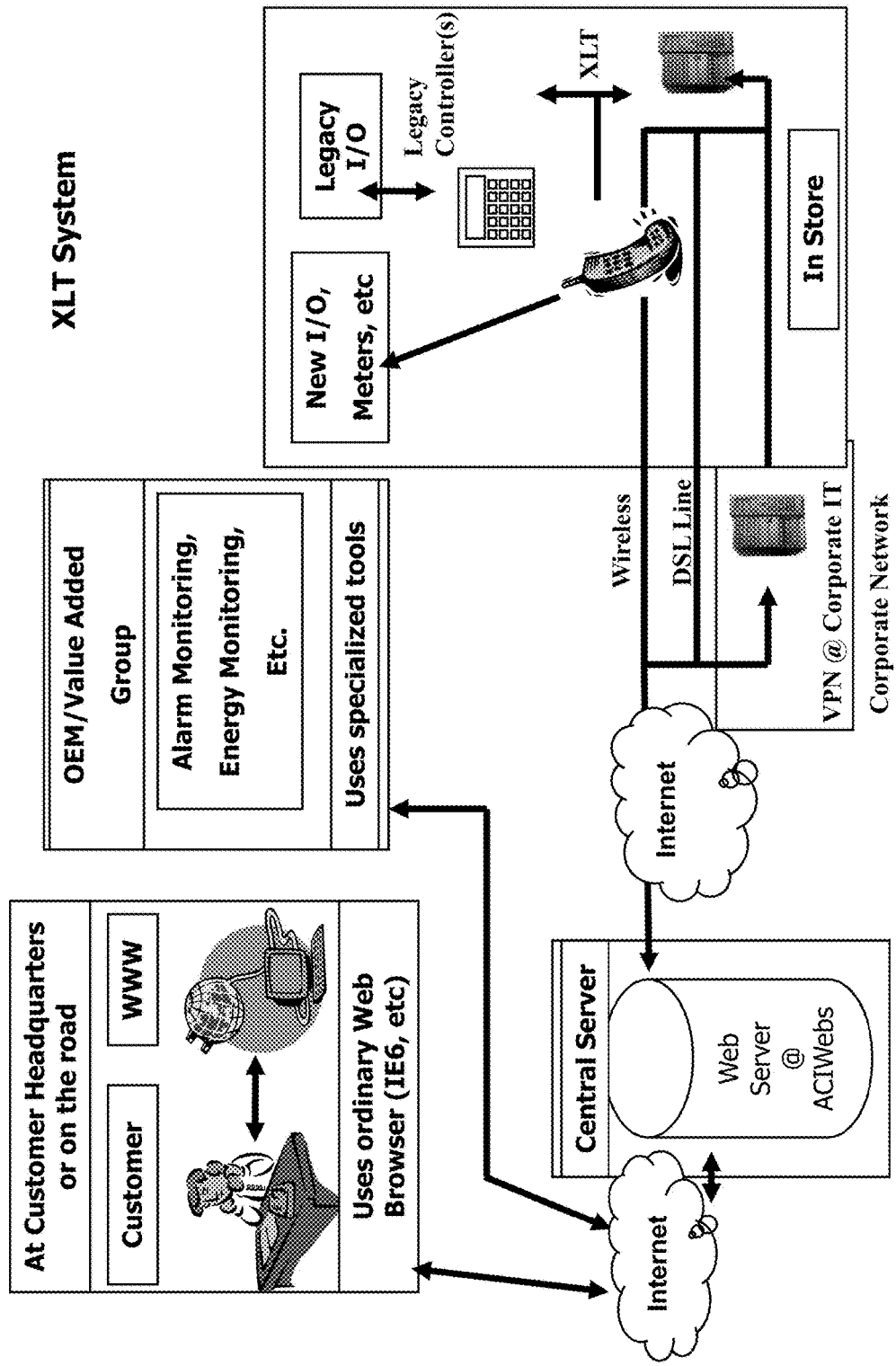
FIG. 6 is a flow chart providing a schematic representation of an exemplary embodiment of the systems and methods according to the invention.

FIG. 6 shows yet another variation of embodiments according to the invention and options applicable to any system or method according to the invention. More particularly, a system of managing supermarket refrigeration information systems is provided which comprises: (a) one or more on-site computers (XLT) for receiving data and data updates from and operably connected with one or more on-site refrigeration control systems (Legacy Controller(s)), wherein the on-site computer has a processor and software for translating the data and data updates into a generic data structure and one or more databases for storing the translated data and data updates; (b) a communication network operably connecting the on-site computers with a central server and for transmitting a copy of each database to a corresponding central server database (which can be a wireless network, DSL line, corporate network, or VPN or combinations thereof); (c) one or more central server having one or more databases for storing a copy of each on-site computer database, a processor, and software for: i) repetitively detecting, at a selected timing interval, that the on-site database contains data updates, ii) making a copy of the updated on-site database, iii) replacing the corresponding copy on the central server with the updated copy; and iv) organizing, drilling, and presenting data to a user from the updated copy of the database on the central server, in response to a query of the user, without retrieving the data individually from the on-site computer; and (d) a second communication network operably connecting the central server with one or more user computers and which is capable of transmitting data therebetween.

Under such systems and methods, customer users can access the management system from any location including from customer headquarters, on site, at home, or even while traveling using any ordinary web browser (Internet Explorer, for example). The user communicates in a two-way communication set up with the central server to retrieve desired information about the legacy control systems at a particular location. OEMs and value added providers can also access the XLT system using specialized tools, if desired.

Building Management Using XLT and Central Server Configuration

Figure 7:
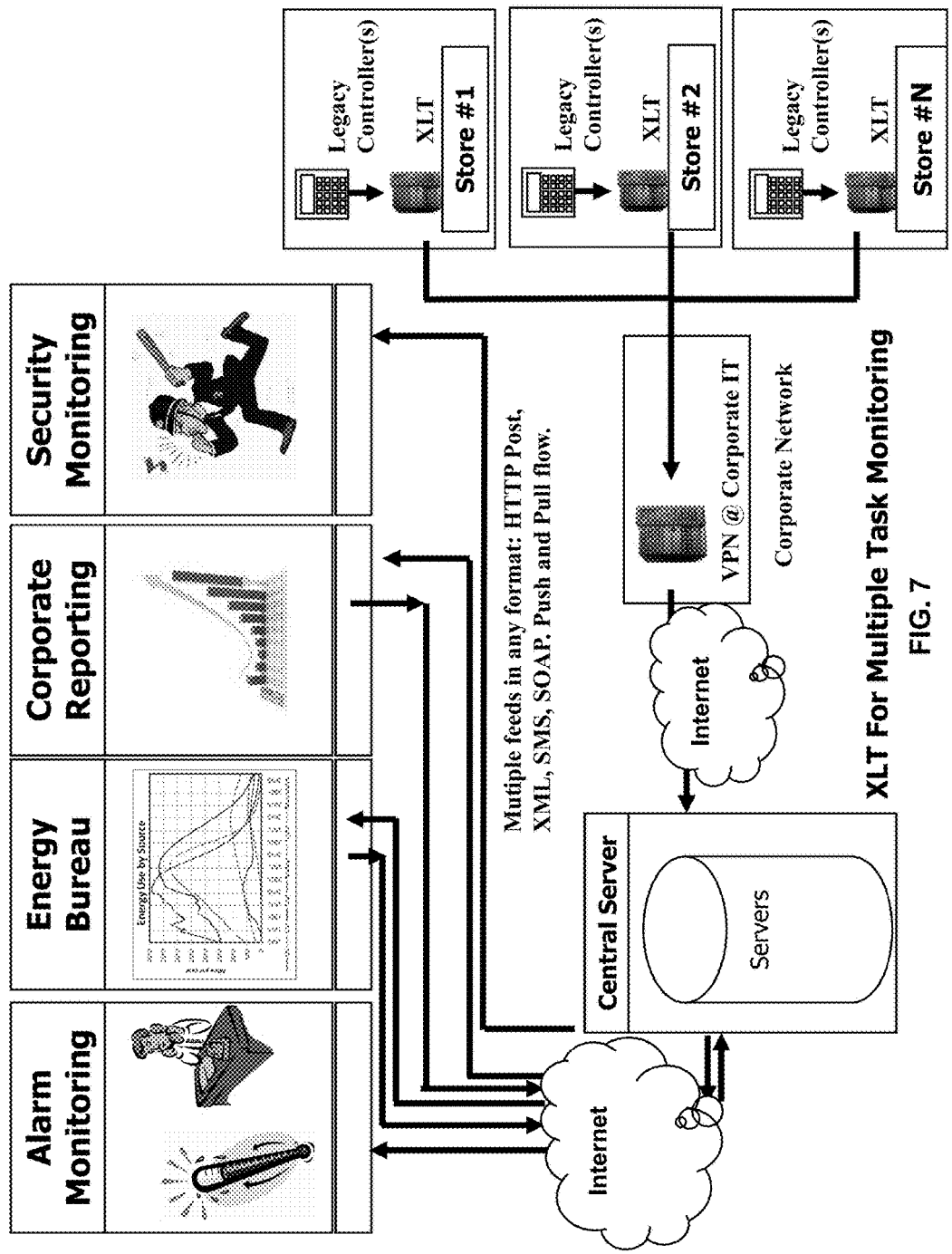
FIG. 7 is a flow chart providing a schematic representation of an exemplary embodiment of the systems and methods according to the invention.

FIG. 7 provides a schematic of how the XLT system can be applied in the context of building management for monitoring, controlling, analyzing, or managing one or more types of site management systems, including heating and air conditioning functions, security functions, lighting functions, sound system functions, and so on.

Additionally, it is noted that this methodology would apply equally well to building security and sound systems.

Energy Monitoring and Management

One of the more beneficial applications of the XLT is as part of a comprehensive energy monitoring and management system. In the current RMCS world, communications and diversity are the barriers to effective management. Controller communications are frequently still in the modern world. Furthermore, in cases where communications have graduated to serial over ethernet, they still face the weakest link of the RMCS baud rate, and the 'Log in, Sign on, and step up to your screen' syndrome. Diversity has to do with the fact that no two manufacturers look or act like each other in their interface, and most vary just as much between different models in their product line. The only way an Energy Management bureau can be ultimately profitable is to highly automate the search for stores that are in aberrant condition. If an operator has to look at stores one after the other to find bad operation, he may be able to search 20 stores in a day. He will have to regularly switch from ComTrol to Danfoss to CPC and back again. To manage 1000 stores, 10 operators would be needed working flat out to get it done. On the other hand, with the XLT it has been shown we would need three packets of XML questions, which in the continental US would take about 200 msec, for each site. Even a moderate system could support 8 channels simultaneously, so we are able to get all the decision data we need for 1000 stores inside of ten minutes, at say 6:00 AM, before the operators show up. Since the data is presented the same, no matter the RMCS, the job of crunching all this data is well within the capability of even moderate power servers, so the list of stores to interact with that awaits each operator at arrival is of those sites already known to be problems, rather than using manpower to search. Finally, the common approach to viewing the operations reduces the time required to find and correct problems. It seems highly likely that 2 operators could manage the same 1000 stores with more consistency and tighter performance. This is the difference in profitability or not, or maybe in whether supermarket chains choose to use these services. In today's energy climate, these are serious questions.

Freeing operators from the tedium of connecting and downloading moves the energy management bureau forward, enabling advanced diagnostics, whole-chain health monitoring, and real-time energy demand response utilizing a thorough understanding of the circuits being cut back to shed power. Current state of the art demand response does wholesale shutdowns, which risks product loss and litigious spoilage issues.

Methods of Control System Management Using XLT and Central Server

Methods of managing supermarket refrigeration information systems according to embodiments of the invention can comprise one or more of the following, performed in any order, and/or in combination with other method activities: 1) receiving information from one or more on-site refrigeration control systems; 2) translating the information with one or more on-site computers operably configured to receive and translate the information into a generic data structure; 3) storing the translated information in one or more databases on or associated with the on-site computer; 4) transferring a copy of the database on the on-site computer to one or more databases located on a central server; 5) polling the on-site computer to determine if an information update has been stored on the database of the on-site computer; 6) upon detection of a change, transferring a copy of the on-site database containing data updates to a database on the central server; 7) optionally replacing the corresponding copy on the central server with the updated copy; and 8) organizing, drilling, and presenting data to a user from the updated copy of the database on the central server, in response to a query of the user, without retrieving the data individually from the on-site computer. And finally, 9) Optionally triggering an alarm event, notifying management of a database change.

The present invention has been described with reference to particular embodiments having various features. It will be apparent to those skilled in the art that various modifications and variations can be made in the practice of the present invention without departing from the scope or spirit of the invention. One skilled in the art will recognize that these features may be used singularly or in any combination based on the requirements and specifications of a given application or design. Other embodiments of the invention will be apparent to those skilled in the art from consideration of the specification and practice of the invention. The description of the invention provided is merely exemplary in nature and, thus, variations that do not depart from the essence of the invention are intended to be within the scope of the invention.

The invention claimed is:

1. A system of managing supermarket refrigeration information systems comprising:
one or more on-site computers for receiving dynamic run-time data, which are magnitudes of one or more sensor measurements, from and operably connected with multiple on-site refrigeration control systems, wherein the on-site computer has a processor and software for translating the dynamic run-time data into a generic data structure and one or more databases for storing the translated dynamic run-time data;
a communication network operably connecting the on-site computers with a central server and for transmitting a copy of each database to a corresponding central server database;
a central server having one or more databases for storing a copy of each on-site computer database, a processor, and software for:
i) repetitively detecting, at a selected timing interval, that the on-site database contains dynamic run-time data updates,
ii) in response to the repetitively detecting of the dynamic run-time data updates, making a complete copy of any updated on-site database,
iii) replacing the corresponding copy on the central server with the updated copy of the database, wherein the updated copy of the database contains current dynamic run-time data; and
iv) in response to a user query of the updated copy of the database on the central server, presenting the current magnitude of the sensor measurement to the user from the updated copy of the database, without retrieving the data individually from the on-site computer;
a second communication network operably connecting the central server with one or more user computers and which is capable of transmitting data therebetween.

2. The system according to claim 1 having multiple on-site computers and multiple on-site refrigeration control systems, wherein each on-site computer is individually operably connected with one on-site refrigeration control system.

3. The system according to claim 1, wherein the central server software is capable of retrieving run-time data from the on-site computer in bulk and correlating the run-time data with static structure information stored on the central server for presentation to a user.

4. The system according to claim 1, wherein the central server software allows users to make queries in a form that contains multiple random access questions and answers the queries in the same fashion.

5. The system according to claim 1, wherein the central server software is operably configured to receive and record alarms from each on-site computer for determining whether service to an on-site refrigeration system is needed.

6. The system according to claim 1, wherein the communication networks are the internet or internet in combination with a VPN.

7. The system according to claim 1, wherein the central server software is operably configured to participate in data interleaving.

8. The system of claim 1, wherein the software for translating is operably configured for translating dynamic run-time data from a terminal-mode-type refrigeration control system and dynamic run-time data from a protocol-oriented-type refrigeration control system.

9. The system of claim 1, wherein the one or more on-site computers are configured to send the dynamic run-time data to a user through a UDP/IP protocol or TCP/IP protocol.

10. The system of claim 1, wherein the dynamic run-time data is one or more of analog or digital temperatures, pressures, amperage or power data.

11. The system according to claim 1, wherein the central server software is operably configured to send an alarm to a user to indicate on-site changes have occurred.

12. The system according to claim 11, wherein the central server software is operably configured to send the alarms in a customer-desired format and send or re-send the alarms in a customer-specified manner.

13. The system according to claim 12, wherein the customer-desired format is chosen from at least one of Short Message Service (SMS) text message, e-mail, pager, voice mail, facsimile, video, and audio.

14. The system of claim 1, wherein each on-site refrigeration control system includes sensors configured to transmit data in analog format and the software is configured to query the analog data.

15. The system of claim 14, wherein the analog data is a magnitude of a sensor measurement, wherein the sensors include a pressure sensor, temperature sensor, or liquid level indicator.

* * * * *